Patented June 25, 1940

2,205,728

UNITED STATES PATENT OFFICE 2,205,728

PROCESS OF MANUFACTURING AMINO KETONES

Henry Martin and Rudolf Hirt, Basel, Switzerland, assignors to the firm J. R. Geigy A. G., Basel, Switzerland No Drawing. Application July 12, 1938, Serial No. 218,879. In Switzerland July 16, 1937

6 Claims. (Cl. 260—457)

This invention relates to the manufacture of amino ketones and has for its object the production of amino ketones, having valuable technical properties, and being useful for various purposes.

According to the present invention amino ketones are produced by causing compounds of the type

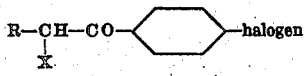

(with exchangeable halogen in the benzene nucleus) and wherein R represents a higher molecular, saturated or unsaturated, substituted or unsubstituted, aliphatic or alicyclic radical with more than 5 C-atoms, which may be linked by heteroatoms or heteroatom groups to the

group, and X represents a hydrogen atom, alkyl, aralkyl or aryl, to act upon secondary amines, capable of reacting, substituted by like or unlike substituents at the nitrogen atom, of aliphatic, aliphatic-araliphatic, aliphatic-hydroaromatic or heterocyclic nature.

The resulting tertiary amino ketones may either be further treated with the usual alkylating agents or converted directly into salts of organic or inorganic acids.

The halogen ketones used as initial material are produced, for example, by causing aliphatic or alicyclic carboxylic acids or their chlorides or esters to act upon aromatic halogenated hydrocarbons or their substitution products.

As carboxylic acids there are mainly suitable higher molecular saturated or unsaturated, also substituted, carboxylic acids, such as oleic acid, stearic acid, palmitic acid, α-methyl palmitic acid, α-benzyl palmitic acid, behenic acid, dodecyloxyacetic acid, campholic acid, fencholic acid, naphthenic acids.

It is however also possible by means of suitable araliphatic carboxylic acids (such as for example phenyl-acetic acids, phenylacetic acid chlorides respectively) to obtain, by reaction with aromatic halogenated hydrocarbons, halogen ketones which can then be converted, by alkylating with higher molecular, aliphatic or alicyclic mineral acid esters—obtained for example from mineral acids and the alcohols which are produced by hydrogenating naturally occurring fats, oils, resins, naphthenic acids—into compounds constituted in the manner claimed, containing reactive halogen (according to the principle of alkylation of the desoxybenzoins). By treating α-4-dichloro-aceto-phenone or its alkyl derivatives substituted in the aliphatic chain, with aliphatic or alicyclic amines, mercaptans or alcoholates there can be obtained ketones with halogen capable of reacting, of which the aliphatic or alicyclic radical is linked by nitrogen, sulphur or oxygen to the

group.

The aromatic hydrocarbons which are used mainly consist of halogenated benzenes, such as chlorobenzene and its homologues.

The halogen ketones containing reactive halogen described, can be converted by simple processes with secondary amines capable of reacting, into the corresponding tertiary amino ketones. For this purpose there are equally suitable dimethylamine, diethylamine, dibutylamine, diamylamine, methylbenzylamine, methylcyclohexylamine, or piperidine, in the presence of certain catalysts such as for example copper powder.

The tertiary amino ketones obtained by the conversion with amines may subsequently be further alkylated, which is best effected by means of the most usual alkylating agents, for example with methyl iodide or with dialkyl sulphates such as dimethyl sulphate, diethyl sulphate or with toluene sulphonic alkyl acid esters and halogenbenzene sulphonic acid alkyl esters.

The N-containing compounds with the exception of the quaternary compounds as bases are very often bodies capable of being easily distilled under reduced pressure, which are difficultly soluble or insoluble in water. They can be converted into water-soluble compounds by the methods generally usual for ammonia derivatives. With inorganic or organic acids there are formed salts, for example hydrochlorides, sulphates, phosphates, silica-fluorates, formates, and citrates.

The amino ketones can be used for the most various purposes. They form valuable wetting, dispersing and emulsifying agents, especially however softening agents for cotton and precipitated cellulose, but also valuable agents for improving the fastness to water of direct dyeings or stripping agents for naphthol-As- or vat-dyeings. In part they are also suitable for protecting wool, feathers, furs, hair, and leather from moths and other wool destroying insects. The bactericidal and fungicidal properties of some of the compounds are also interesting.

The invention is illustrated by the following examples, the parts being by weight where nothing other is said:

*Example 1*

500 parts of chlorobenzene are treated with 100 parts of aluminium chloride and whilst stirring 200 parts of stearic acid chloride are added in drops. After 15 hours at 70–80° C. cooling takes place, the mixture is poured into water and distilled with steam until all the excess of chlorobenzene has disappeared. There remain 250 parts of p-chlorostearophenone.

75 parts of this compound are heated to 220–230° C. for 20 hours in an autoclave with an alcoholic solution of 22.5 parts of dimethylamine in 500 volume parts of alcohol and some copper powder. After removing the copper powder and expelling the solvent there are obtained 67 parts of p-dimethylamino-stearophenone.

58 parts of p-dimethylamino-stearophenone and 31 parts of diethyl sulphate are heated for 2 hours to 130–140° C. There are formed 89 parts of the water-soluble p-dimethyl-ethyl-ammonium-stearophenone-etho-sulphate.

The formulae on which this example is based are the following:

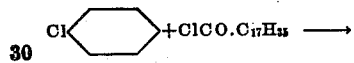

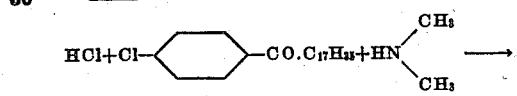

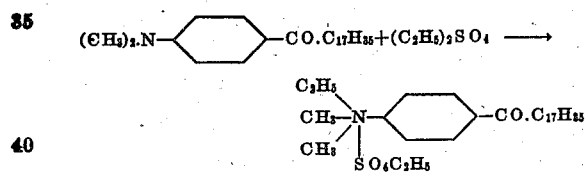

Instead of stearic acid chloride other acid chlorides may be used, such as palm nut fatty acid chloride, α-methyl palmitic acid chloride, oleic acid chloride or fencholic acid chloride. The dimethylamine may also be replaced by diethylamine, dipropylamine or methylcyclohexylamine. By replacing the diethyl sulphate by toluene sulphonic acid methyl-ester, there are obtained substances with different properties.

*Example 2*

500 parts of chlorobenzene are treated with 300 parts of aluminium chloride and there are added in drops, while stirring, 309 parts of phenylacetic acid chloride. After heating for 2 hours at 50° C. the mixture is poured on ice, the excess of chlorobenzene removed by means of steam, the residue, the p-chlorodesoxybenzoin is sucked off, dried and distilled in a vacuum. Boiling point at 16 m./m. 199–200° C.

4.5 parts of sodium are dissolved in 350 volume parts of alcohol and treated with 46 parts of p-chlorodesoxybenzoin. After all has passed into solution by production of heat, there are added 61 parts of cetyl bromide and boiling takes place for 10 hours under reflux. Thereupon it is poured into water, etherized, the ether washed with soda lye and hydrochloric acid, then dried and expelled. The residue is distilled, boiling point at 1.3 m./m. 270–280° C.

45.4 parts of the p-chloro-ms-hexadecyl-desoxybenzoin are heated for 20 hours to 220° C. in a closed vessel with a solution of 20 parts of dimethylamine in 250 volume parts of alcohol and some copper powder. The separated product is sucked off, dissolved in benzene, the copper powder removed and the solution again evaporated.

23 parts of p-dimethylamino-ms-hexadecyl-desoxybenzoin are heated with 7 parts of dimethyl sulphate for 1 hour to 125° C. There is formed a wax-like mass which is clearly soluble in water.

The formulae on which this example is based are the following:

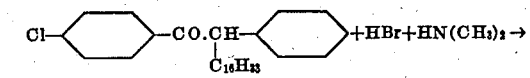

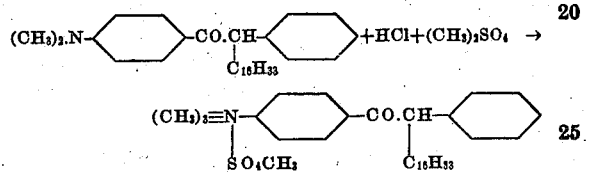

Instead of the p-dimethylamino-ms-hexadecyl-desoxybenzoin there may also be used the p-dimethylamino-ms-dodecyl-desoxybenzoin.

What we claim is:

1. A process for the production of aromatic amino ketones, comprising causing a ketone of the formula

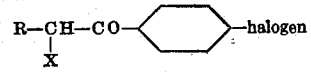

wherein R represents a member of the group consisting of alkyl, cycloalkyl, alkyl-Y-, cycloalkyl-Y-, containing more than 5 C-atoms with Y representing a member selected from the group consisting of O, S, N-alkyl and N-cyclo alkyl, X represents a member of the group consisting of H, alkyl, aralkyl and aryl, to react with a secondary amine, capable of reacting, selected from the group consisting of aliphatic, aliphatic-araliphatic, aliphatic-hydroaromatic and heterocyclic nature.

2. A process for the production of aromatic quaternary amino ketones, comprising treating the p-aminoketones obtained by the process of claim 1 with alkylating agents.

3. A process for the production of aromatic quaternary amino ketones, comprising causing a ketone of the formula

with R as aliphatic radical with at least 6 carbon atoms, to react with a dialkylamide and treating the resulting p-dialkylamino ketone of the formula

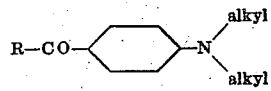

with a dialkyl sulphate.

4. A process for the production of an aromatic quaternary amino ketone, comprising causing p-chlorostearophenone to react with dimethylamine and reacting the resulting p-dimethylamino-stearophenone with dimethyl sulphate.

5. A process for the production of an aromatic quaternary amino ketone, comprising causing p-chlorostearophenone to react with dimethylamine and reacting the resulting p-dimethylamino-stearophenone with diethyl sulphate.

6. A process for the production of an aromatic quaternary amino ketone, comprising causing p-chloro-laurophenone (made from palm nut fatty acid chloride and p-chlorobenzene in the presence of $AlCl_3$) to react with dimethylamine and reacting the resulting p-dimethylamino-laurophenone with dimethyl sulphate.

HENRY MARTIN.
RUDOLF HIRT.